United States Patent
Kempers (10) Patent No.: US 11,073,042 B2
(45) Date of Patent: Jul. 27, 2021

(54) SELF-COOLING OIL TANK

(71) Applicant: Rolls-Royce Corporation, Indianapolis, IN (US)

(72) Inventor: Adam Kempers, Indianapolis, IN (US)

(73) Assignee: Rolls-Royce Corporation, Indianapolis (IN)

( * ) Notice: Subject to any disclaimer, the term of this patent is extended or adjusted under 35 U.S.C. 154(b) by 235 days.

(21) Appl. No.: 16/297,326

(22) Filed: Mar. 8, 2019

(65) Prior Publication Data
US 2020/0284165 A1    Sep. 10, 2020

(51) Int. Cl.
| | |
|---|---|
| F01D 25/20 | (2006.01) |
| F16N 19/00 | (2006.01) |
| F01M 1/02 | (2006.01) |
| F16N 7/40 | (2006.01) |
| F16N 39/02 | (2006.01) |
| F02C 7/14 | (2006.01) |
| F16N 21/00 | (2006.01) |
| F28D 7/16 | (2006.01) |

(52) U.S. Cl.
CPC .......... *F01D 25/20* (2013.01); *F01M 1/02* (2013.01); *F02C 7/14* (2013.01); *F16N 7/40* (2013.01); *F16N 19/00* (2013.01); *F16N 21/00* (2013.01); *F16N 39/02* (2013.01); *F16N 2210/02* (2013.01); *F28D 7/16* (2013.01)

(58) Field of Classification Search
CPC ... F01D 25/20; F01M 1/02; F02C 7/14; F16N 7/40; F16N 19/00; F16N 21/00; F16N 39/02; F16N 2210/02; F28D 7/16
See application file for complete search history.

(56) References Cited

U.S. PATENT DOCUMENTS

| | | | | |
|---|---|---|---|---|
| 3,550,725 | A * | 12/1970 | Hegglin | F01P 9/00 184/104.3 |
| 6,348,087 | B1 * | 2/2002 | Aslin | B01D 19/0057 96/210 |
| 6,378,509 | B1 * | 4/2002 | Feucht | F02M 26/43 123/568.12 |
| 6,463,819 | B1 * | 10/2002 | Rago | F01M 11/067 184/6.2 |
| 6,502,630 | B1 * | 1/2003 | MacFarlane | F16N 39/002 123/196 AB |

(Continued)

FOREIGN PATENT DOCUMENTS

| | | |
|---|---|---|
| CN | 107762634 | 3/2018 |
| EP | 0540886 | 5/1993 |

(Continued)

*Primary Examiner* — Michael A Riegelman
(74) *Attorney, Agent, or Firm* — Brinks Gilson & Lione (57) ABSTRACT

A self-cooling fluid storage container includes a reservoir to store a fluid at a level that allows for an air space above the fluid. The fluid enters the reservoir. A fluid conduit receives the fluid at a fluid input opening to an internal fluid conduit that extends upward towards the air space. A heat exchanger portion extends sufficiently near the air space to provide a thermal exchange with the air space. The heat exchanger receives fluid to provide a cooling of the air space. The internal fluid conduit continues extending downward from the air space to a fluid output opening for distribution to a system that uses the fluid.

19 Claims, 5 Drawing Sheets

(56) References Cited

U.S. PATENT DOCUMENTS

| | | | | |
|---|---|---|---|---|
| 6,958,107 | B1* | 10/2005 | Clarke | B04C 3/06 |
| | | | | 159/2.1 |
| 7,377,098 | B2* | 5/2008 | Walker | F01D 9/065 |
| | | | | 60/39.08 |
| 7,458,414 | B2* | 12/2008 | Simon | F15B 1/26 |
| | | | | 165/41 |
| 2010/0025159 | A1* | 2/2010 | Gmirya | F01M 11/10 |
| | | | | 184/6.4 |
| 2015/0151231 | A1* | 6/2015 | Loh | B04C 5/13 |
| | | | | 95/271 |
| 2016/0032770 | A1* | 2/2016 | Sheridan | B01D 19/0068 |
| | | | | 60/39.08 |
| 2019/0316522 | A1* | 10/2019 | Menczykalski | F02C 7/06 |
| 2020/0271014 | A1* | 8/2020 | Gebhard | F01M 11/0004 |
| 2020/0284165 | A1* | 9/2020 | Kempers | F01M 1/02 |
| 2020/0284337 | A1* | 9/2020 | Gebhard | F01D 15/12 |
| 2021/0054763 | A1* | 2/2021 | Kempers | B01D 29/03 |

FOREIGN PATENT DOCUMENTS

| | | |
|---|---|---|
| RU | 2578784 | 3/2016 |
| WO | WO0226024 | 4/2002 |

* cited by examiner

SELF-COOLING OIL TANK

FIELD OF DISCLOSURE

The present invention relates to oil tank and oil distributions systems, and more particularly, to storing and cooling oil in an oil tank.

BACKGROUND

Oil is a well-known lubricant used in many different mechanical devices. Many such devices, such as for example, combustion engines and gas turbine engines, operate in environments subject to extreme heat and other harsh factors. Some environments, such as gas turbine engines, are subject to weight limitations for the components used in the engine.

Typical oil distribution systems comprise an oil tank for storing the oil, an oil pump, a lubrication target (such as, for example, a gas turbine engine), and an oil cooling mechanism. Oil distribution systems for lubrication in gas turbine engines that power aircraft are subject to both extreme heat, space, structural robustness, and weight limitations. In the description below, the lubrication target is assumed to be a gas turbine engine, but may be any other mechanical device with similar needs. The oil stored in the oil tank is delivered to the gas turbine engine by the oil pump. In a gas turbine engine, like in many other types of mechanical devices, the oil lubricates and cools moving parts. The engine components requiring lubrication generate heat, but the location of the mechanical parts may add to the heat generated. For example, the combustion section and the turbine section in a gas turbine engine can become extremely hot. Typical oil distribution systems, particularly those made of composite materials, are limited in the position in the engine space in which they can operate.

To address weight limitations, oil distribution systems have been designed to include oil tanks made of composite materials instead of metal. Composite materials are, however, sensitive to extreme heat raising a risk of damage to the oil tanks. The use of composite materials for constructing oil tanks may require additional cooling measures in order to avoid that thermal damage; those measures would add components and thereby weight while occupying additional space. The additional cooling measures may reduce advantages gained regarding weight and space by using composite materials.

SUMMARY

In view of the above, a self-cooling fluid storage container includes a reservoir configured to store a fluid between a minimum fluid level and a maximum fluid level. The maximum fluid level allows for an air space in the reservoir above the fluid. The fluid enters the reservoir via a fluid input port. An internal fluid conduit receives fluid from the reservoir at a fluid input opening below the minimum fluid level. The internal fluid conduit extends upward towards the air space. A heat exchanger portion extends sufficiently near the air space to provide a thermal exchange with the air space. The heat exchanger receives fluid to provide a cooling of the air space. The internal fluid conduit continues extending downward from the air space to a fluid output opening for distribution to a system that uses the fluid.

In another aspect, an oil storage system is provided to contain oil for distribution to a gas turbine engine. The oil storage system includes a reservoir configured to store oil between a minimum fluid level and a maximum fluid level. The maximum fluid level allows for an air space in the reservoir above the oil. The reservoir includes a fluid input port to receive hot oil from the gas turbine engine and to deposit the hot oil into the reservoir. An internal oil conduit is provided with a fluid input opening below the minimum fluid level. The internal oil conduit extends upward toward the air space. A heat exchanger portion is disposed in sufficient proximity to the air space to provide a thermal exchange. The heat exchanger portion receives oil from a bottom end of the reservoir to cool the air space. The internal oil conduit continues extending downward from the heat exchanger portion to a fluid output opening for distribution to the gas turbine engine.

In another aspect, a pump is fluidly connected to the fluid storage container to power fluid to the engine.

In another aspect, a scavenge pump is provided to power fluid into the internal fluid conduit.

In another aspect, a check valve ensures fluid flow in the internal fluid conduit in one direction.

In another aspect, the heat exchanger portion comprises a plurality of sub-conduits distributed in the reservoir to cool structure surrounding the air space.

DETAILED DESCRIPTION

As used in the description below, the terms "fluid storage container," and "oil storage container" shall be used interchangeably as a container for storing a fluid, such as for example, oil. Oil for lubrication in a gas turbine engine is used herein as a fluid and type of application in which example systems and containers find advantageous use. Example implementations are not limited however, to oil, or to gas turbine engines. Any fluid used in applications subject to high heat levels may find advantageous use in example implementations.

Figure 1:
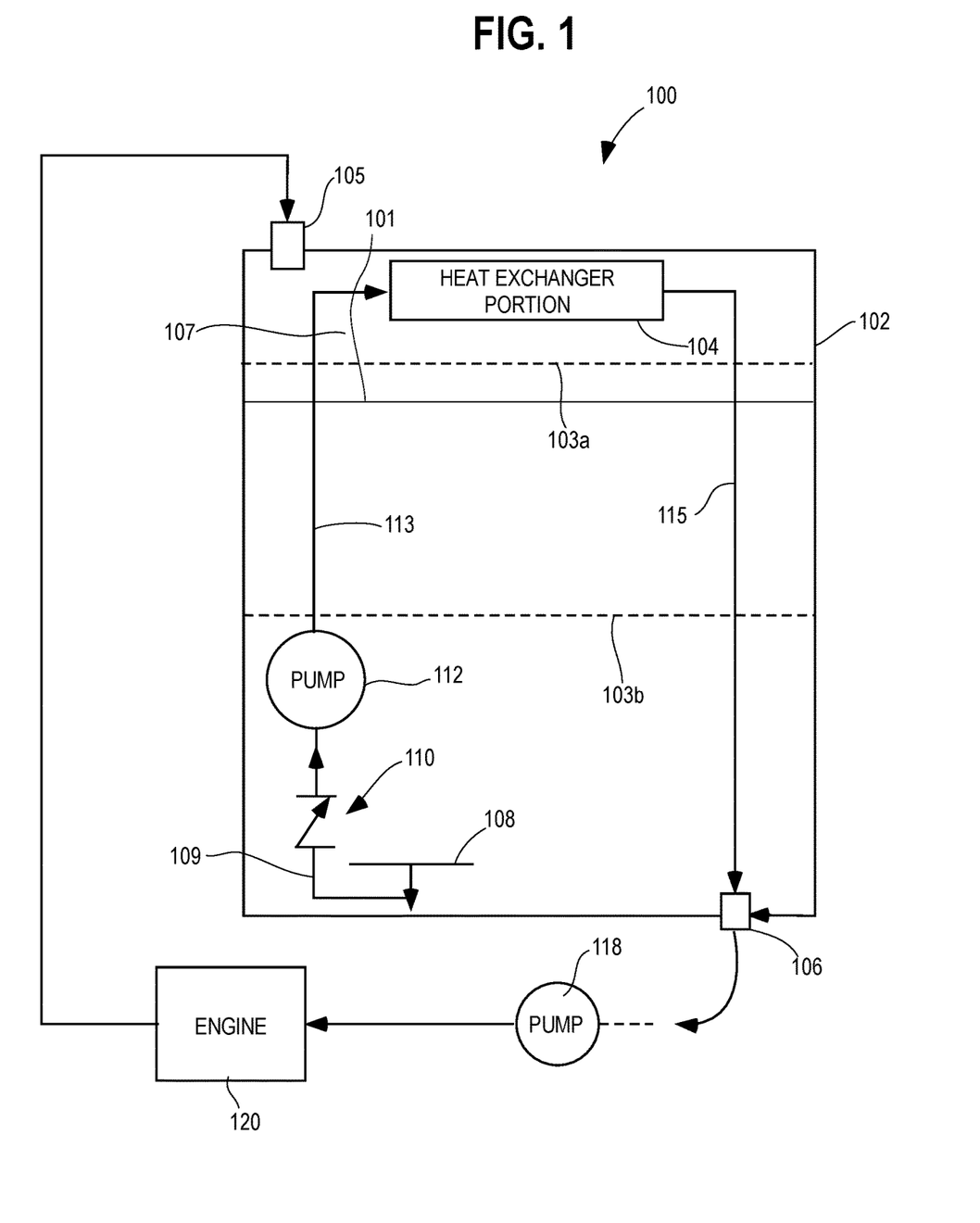
FIG. 1 is a schematic diagram of an example of a fluid distribution system that provides oil to an engine.

FIG. 1 is a schematic diagram of an example of a fluid distribution system 100 that provides a fluid (such as, for example, oil) to an engine 120. The fluid distribution system 100 in FIG. 1 includes a fluid storage container having a reservoir 102 configured to store a fluid 101 between a maximum fluid level 103a and a minimum fluid level 103b. The maximum fluid level 103a is set or defined for the reservoir 102 to allow for an air space 107 in the reservoir 102 above the fluid 101. A fluid input port 105 is disposed in the reservoir 102 to receive fluid and to deposit the fluid into the reservoir 102. An internal fluid conduit includes a first conduit 109, a second conduit 113, a heat exchanger portion 104, and a third conduit 115. A fluid input 108 provides an opening to the first conduit 109 of the internal fluid conduit. The fluid input 108 is positioned below the minimum fluid level 103b. The internal fluid conduit extends upward to the heat exchanger portion 104.

The heat exchanger portion 104 may be configured in any suitable way to provide a thermal exchange with the air space 107. In an example implementation, fluid may enter the reservoir 102, which may be subject to heat from the environment. The fluid at a bottom end of the reservoir 102 in such systems is typically cooler than the fluid at or near its surface and cooler than the air in the air space 107. The heat exchanger portion 104 is configured to receive the fluid and cool the air space 107 creating a risk of damage to the reservoir 102. The third conduit 115 of the internal fluid conduit continues extending downward from the air space 107 to a fluid output opening 106 for distribution to components that use the fluid, such as for example, a gas turbine engine 120.

The fluid storage container in FIG. 1 includes a scavenger pump 112 and a check valve 110 in the internal fluid conduit within the reservoir 102. The scavenger pump 112 receives fluid from the reservoir 102 and pumps the fluid up towards the heat exchanger portion 104. The check valve 110 prevents the fluid from flowing downward. Example implementations may include both the pump 112 and check valve 110, one or the other, or neither. In some implementations, the fluid flow is controlled by an external pump 118, which pumps the fluid to the engine 120. The flow of fluid caused by the external pump 118 draws fluid from the reservoir 102 into the internal conduit 109, 113 and into the heat exchanger portion 104 where the air space 107 is cooled. The fluid then exits the reservoir 102 at the fluid output opening 106.

It is noted that the heat exchanger portion 104 may be, for example, any fluid pathway that allows for cooler fluid from the bottom end of the reservoir to come into thermal contact with the hot air space and structure surrounding the air space. In effect, the fluid stored in the reservoir 102 may be used as a coolant to operate the heat exchanger portion 104.

Figure 2:
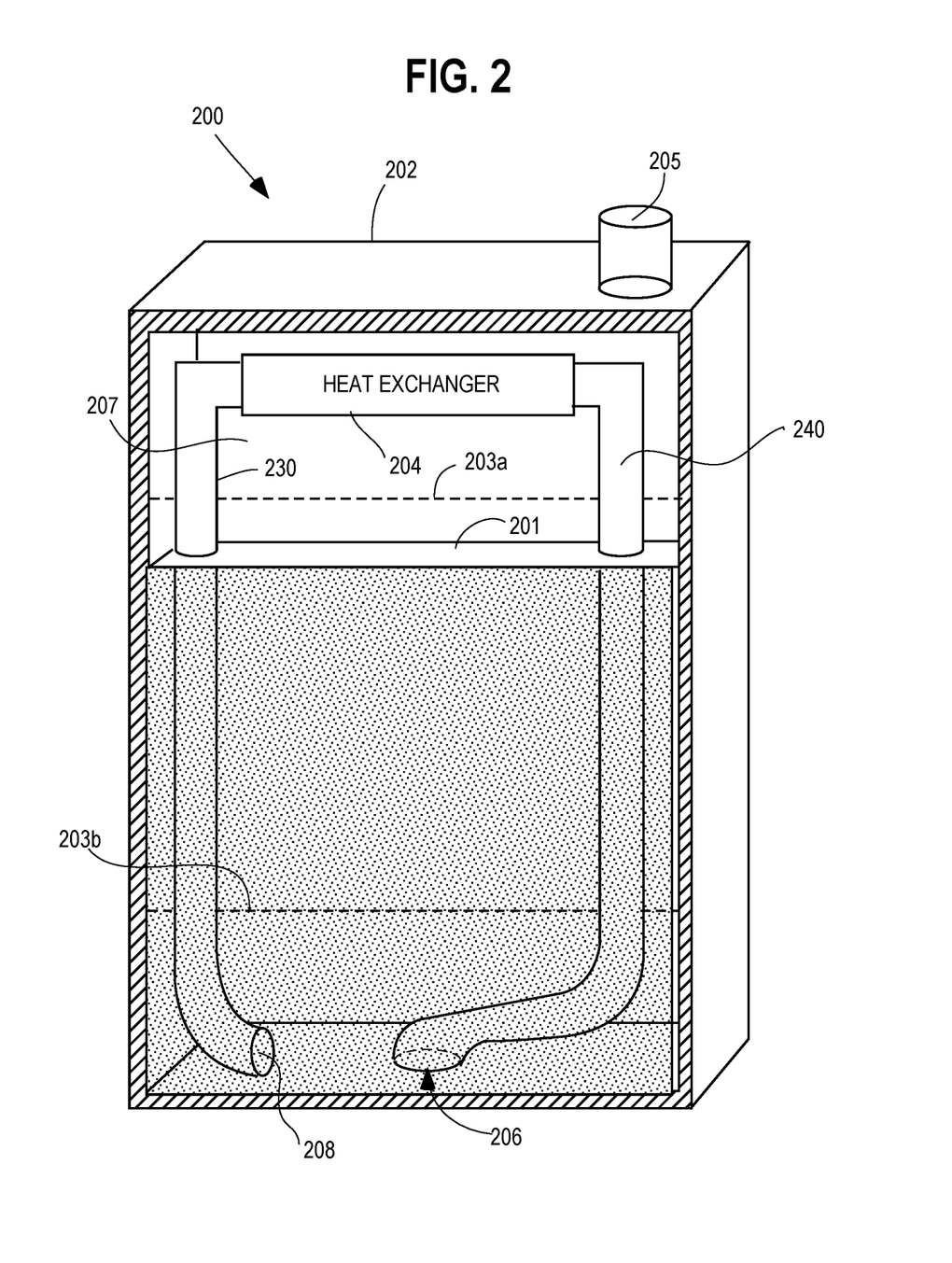
FIG. 2 is a front cross-sectional isometric view of an example of a fluid storage container that may be used in the fluid distribution system of FIG. 1.

FIG. 2 is a front cross-sectional isometric view of an example of a fluid storage container that may be used in the fluid distribution system of FIG. 1. The example fluid storage container in FIG. 2 may be used for storing oil in, for example, a gas turbine engine and is referred to in this description as an oil storage system 200. It is to be understood that the implementation of the oil storage system 200 in FIG. 2 may be used for any other fluid distribution system other than oil. The oil storage system 200 in FIG. 2 includes a reservoir 202 configured to receive oil via an oil input 205 and to store oil 201 between a maximum fluid level 203a and a minimum fluid level 203b. As described above with reference to FIG. 1, the maximum fluid level 203a is set to allow for an air space 207 in the reservoir 202 above the fluid 201. A fluid input port 205 receives the oil and deposits the oil into the reservoir 202. An internal fluid conduit includes a first conduit 230, a heat exchanger portion 204, and a second conduit 240. A fluid input 208 provides an opening to the first conduit 230 of the internal fluid conduit. The fluid input 208 is positioned below the minimum fluid level 203b. The internal fluid conduit extends upward to the heat exchanger portion 204.

The example implementation in FIG. 2 may also include a scavenger pump (112 in FIG. 1) and/or a check valve (110 in FIG. 1). Without the pump 112, the oil flow may be controlled using a pump connected to the oil output 206 as shown in FIG. 2.

The oil storage system 200 shown in FIG. 2 for storing oil may be made of a composite material, or another suitable material, such as for example, aluminum. The internal oil conduit 230, 240 may also be made of any other suitable material, such as a composite material, or a light metal.

The heat exchanger portion 204 may be implemented in a variety of ways. In some example implementations, the heat exchanger portion 204 uses the oil in the reservoir 202 as a coolant for the air space 207 and the structure surrounding the air space 207. The internal oil conduit 230, 240 may be configured to transport the oil 201 in sufficient proximity to the air space 207 to make thermal contact with the air space 207. The heat exchanger portion 204 may also be configured to cool selected hot spots that may form based on the heat generated.

Figure 3:
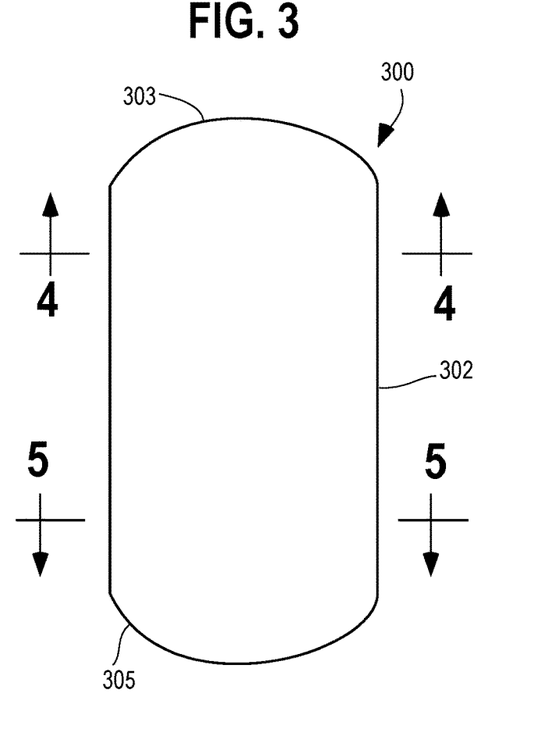
FIG. 3 is a front view of an example of a fluid storage container that may be used in an example of the system shown in FIG. 1.
Figure 4:
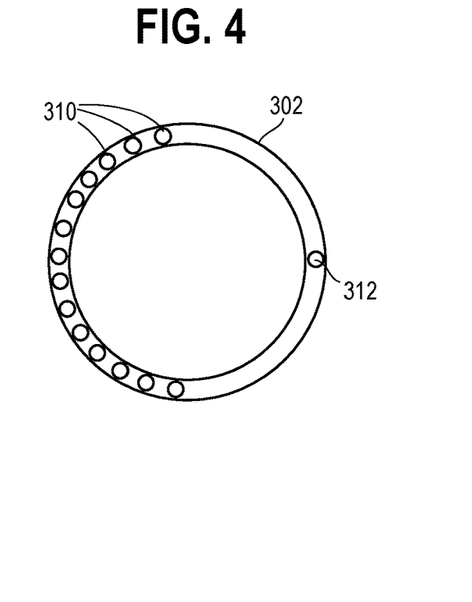
FIG. 4 is a top cross-sectional view of the fluid storage container indicated by section lines 4 in FIG. 3.
Figure 5:
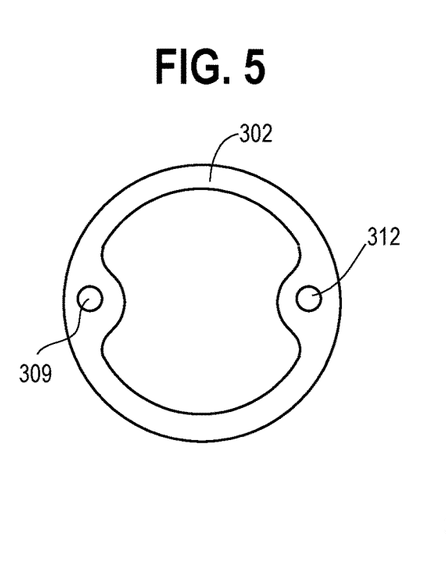
FIG. 5 is a top cross-sectional view of the fluid storage container indicated by section lines 5 in FIG. 3.
Figure 6:
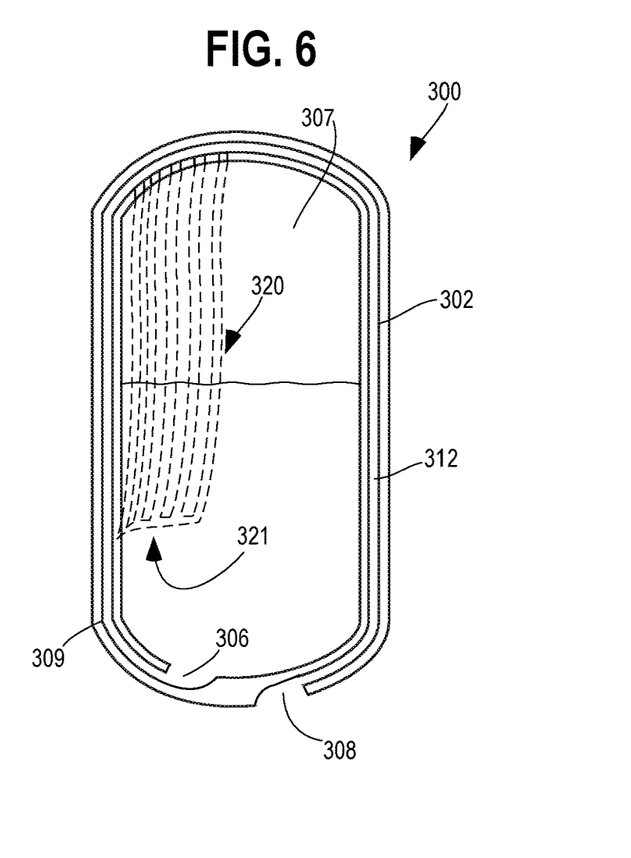
FIG. 6 is a front cross-sectional and transparent view of the fluid storage container in FIG. 3.

FIGS. 3-6 illustrate one example of a configuration of internal fluid conduits to operate as a heat exchanger. FIG. 3 is a front view of an example of a fluid storage container 300 that may be used in an example of the system shown in FIG. 1. FIG. 4 is a top cross-sectional view of the fluid storage container 300 indicated by section lines 4 in FIG. 3. FIG. 5 is a top cross-sectional view of the fluid storage container 300 indicated by section lines 5 in FIG. 3. FIG. 6 is a front cross-sectional and transparent view of the fluid storage container 300 in FIG. 3.

Referring to FIGS. 3-6, the fluid storage container 300 includes a reservoir 302 configured to contain and store oil received from a gas turbine engine, for example. Other details described above, such as the input and output openings and other details are not shown in FIG. 3. The fluid storage container 300 is shown as having a substantially rectangular shape with domed upper end 303 and a domed bottom end 305. The fluid storage container 300 forms the reservoir 302 as a hollow form surrounded by walls having conduits embedded therein.

A plurality of oil conduits 310 are disposed in a wall of the fluid storage container 300 as shown in FIG. 4. The conduits 310 are configured to permit oil to flow therein in an upward direction toward the upper end 303. The conduits 310 in FIG. 4 are depicted as extending through the wall of the fluid storage container 300 on one half of the reservoir 302. The openings to the conduits 310 in FIG. 4 may branch out from a single conduit that opens near the bottom end 305 below the minimum fill level. FIG. 5 depicts the cross-section of the fluid storage container 300 near the bottom end 305. The wall of the reservoir 302 includes an input fluid conduit 309 on one side of the fluid storage container 300 and an output fluid conduit 312 on the opposite side of the fluid storage container 300. The oil is transported upward through the input fluid conduit 309 and flows through a conduit bypass 321 as shown in FIG. 6. The oil flows up through conduit 309, through the conduit bypass 321, and up through a plurality of sub-conduits 320 towards the top end 303 of the fluid storage container 300. The oil then flows in the output fluid conduit 312 downward towards an oil outlet 308.

The plurality of sub-conduits 320 forms a heat exchanger portion in the fluid storage container 300 in FIG. 6. Heat may be transferred from the structure surrounding an air space 307 to the oil flowing in the sub-conduits 320 thereby cooling the air space 307. The sub-conduits 320 may be distributed in any suitable manner to direct the cooling where it may be needed most in a specific implementation.

It is noted that the oil (or other fluid) need not flow in sub-conduits. In another example, an annulus is provided in the container such that the fluid substantially surrounds a selected area or surface of the container. In the example shown in FIGS. 3-6, the sub-conduits may be replaced by a fluid passage surrounding the area cooled by the sub-conduits. In other implementations, the oil (or other fluid) may flow from the bottom of the container and exit from any other area of the container.

Figure 7:
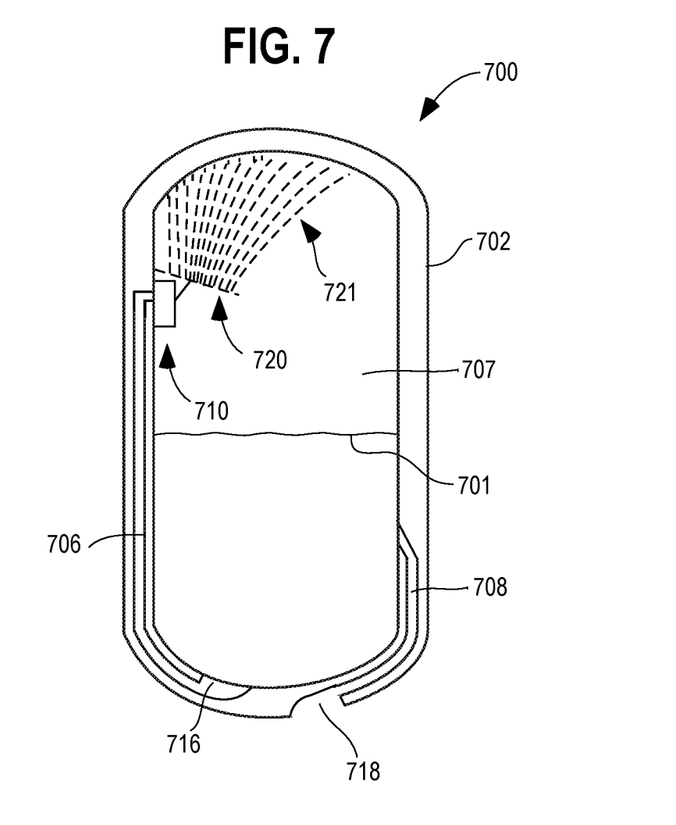
FIG. 7 is a front cross-sectional view of another example implementation of the fluid storage container in FIG. 2.

FIG. 7 illustrates another configuration of a heat exchanger portion that uses oil as a coolant. The oil storage system 700 in FIG. 7 includes the reservoir 702, an input oil conduit 706, and an output oil conduit 708. The input oil conduit 706 includes an opening 716 at the bottom end of the oil storage system 700. The input oil conduit 706 extends upward to an oil pump 710 that pumps the oil into a mister 720. The mister 720 is directed to generate an oil mist 721 towards the structure surrounding the air space 707 to cool the structure and thereby cool the air space 707. The misted oil drops into the reservoir 702 to pool at 701. The oil then flows into an opening of output oil conduit 708, which leads the oil out through an oil opening 718.

The mister 720 in FIG. 7 may be directed to provide a comprehensive cooling of the air space 707. The mister 720 may also be controlled to direct the oil mist 721 in a selected direction.

Figure 8:
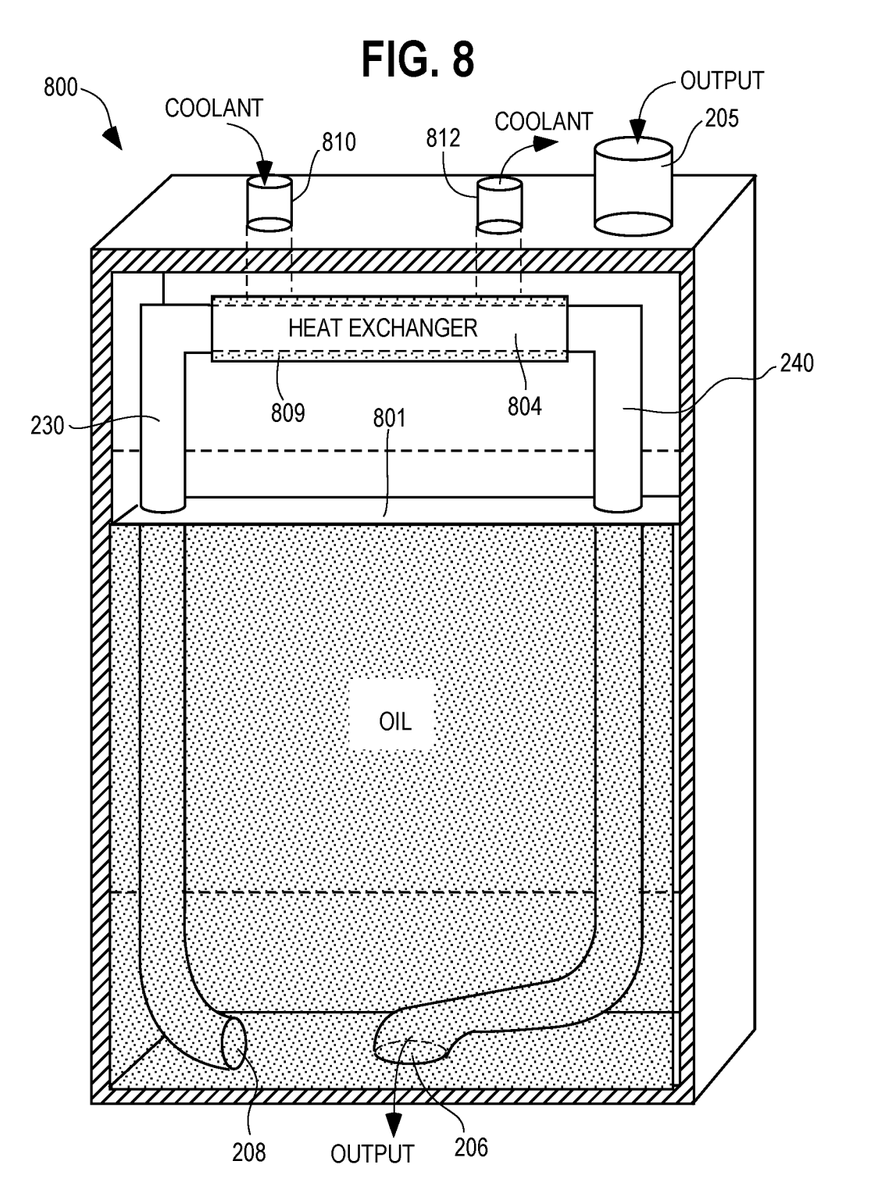
FIG. 8 is a front cross-sectional isometric view of another example of the fluid storage container of FIG. 2.

FIG. 8 is a diagram of an example of the oil storage system 200 in FIG. 2 using a supplemental coolant to supplement the heat exchange. FIG. 8 shows an oil storage system 800 having a heat exchanger 804 that conducts oil 801 from the input oil conduit 230 towards the output oil conduit 240. The heat exchanger 804 may receive a coolant from outside the oil storage system 800. The coolant may, for example, be a fuel that may be used to power a gas turbine engine. Such fuel typically requires warming before use. The heat exchange between the oil and hot air in the air space 707 and the fuel warms the fuel while cooling the oil and air space. The coolant enters at a coolant input 810 and flows into the heat exchanger 804 to contact heat exchange elements in the heat exchanger 804 that conduct the oil. The fuel then exits the heat exchanger at a coolant output 812 advantageously warmed for use to power the gas turbine engine.

Fuel is an example of a coolant that may be used in the heat exchanger 804 in FIG. 8. Other coolant types may be used as well. As was noted above, the examples described herein use oil as a working fluid and a gas turbine engine as an example application. However, examples of implementations described above may also be used for any other working fluid in any other application that operates in the types of harsh environments described above.

Those of ordinary skill in the art will understand that the oil storage system 700 in FIG. 7 and the oil storage system 800 in FIG. 8 may be used as fluid storage containers or systems for any other type of fluid other than oil in any other suitable application. Example implementations are not limited to oil, gas turbine engines or aircraft.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure. Numerous modifications to the present disclosure will be apparent to those skilled in the art in view of the foregoing description. It should be understood that the illustrated embodiments are exemplary only, and should not be taken as limiting the scope of the disclosure.

What is claimed is:

1. A fluid storage container comprising:
   a reservoir configured to store a fluid between a minimum fluid level and a maximum fluid level, wherein the maximum fluid level allows for an air space in the reservoir above the fluid;
   a fluid input port to receive fluid and to deposit the fluid into the reservoir;
   an internal fluid conduit comprising a fluid input opening below the minimum fluid level, the internal fluid conduit extending upward;
   a heat exchanger portion in sufficient proximity to the air space to provide a thermal exchange, the heat exchanger portion configured to receive fluid providing a cooling of the air space, wherein the internal fluid conduit continues extending downward from the air space to a fluid output opening for distribution to a system that uses the fluid; and
   wherein the internal fluid conduit is disposed within a reservoir wall and wherein the heat exchanger portion comprises at least one conduit extension in a reservoir wall portion that surrounds the air space.

2. The fluid storage container of claim 1 wherein the fluid reservoir is made of any material nearing its thermal limits.

3. The fluid storage container of claim 1 wherein the fluid reservoir is made of composite, aluminum, titanium, and steel material.

4. The fluid storage container of claim 1 further comprising a check valve in the internal fluid conduit to ensure fluid flow in only one direction.

5. The fluid storage container of claim 1 further comprising a scavenge pump disposed to receive fluid from the fluid input opening and to power the fluid towards the heat exchanger portion.

6. The fluid storage container of claim 1 wherein the fluid output opening transfers fluid to a fluid pump, which powers the fluid transport to the system that uses the fluid.

7. The fluid storage container of claim 1 wherein the fluid is oil and the system that uses the fluid is a gas turbine engine that uses the oil for lubrication before sending hot oil to the fluid input port of the reservoir.

8. The fluid storage container of claim 7 wherein the internal fluid conduit branches into the heat exchanger portion comprising a plurality of sub-conduits disposed to surround at least a portion of the reservoir wall portion that surrounds the air space.

9. The fluid storage container of claim 1 wherein the heat exchanger portion comprises a fluid mister configured to spray cooling fluid into a hot area of the container.

10. The fluid storage container of claim 1 further comprising:
    a heat exchanger container configured to receive the fluid from the oil reservoir into a heat exchanger element disposed in the heat exchanger container; and a cooling conduit configured to deposit a coolant in the heat exchanger container in thermal contact with the heat exchanger element.

11. An oil storage system configured to contain oil for distribution to a gas turbine engine, the system comprising:
   a reservoir configured to store oil between a minimum fluid level and a maximum fluid level, wherein the maximum fluid level allows for an air space in the reservoir above the oil;
   a fluid input port to receive oil from the gas turbine engine and to deposit the oil into the reservoir;
   an internal oil conduit comprising a fluid input opening below the minimum fluid level, the internal oil conduit extending upward;
   a heat exchanger portion in sufficient proximity to the air space to provide a thermal exchange, the heat exchanger portion configured to receive oil from a bottom end of the reservoir to cool the air space, wherein the internal oil conduit continues extending downward from the heat exchanger portion to a fluid output opening for distribution to the gas turbine engine using an oil pump; and
   wherein the internal fluid conduit is disposed within a reservoir wall and wherein the heat exchanger portion comprises at least one conduit extension in a reservoir wall portion that surrounds the air space.

12. The oil storage system of claim 11 wherein the reservoir is made of a composite material.

13. The oil storage system of claim 11 further comprising a check valve in the internal oil conduit to ensure fluid flow in only one direction.

14. The oil storage system of claim 11 further comprising a scavenge pump disposed to receive fluid from the fluid input opening and to power the fluid towards the heat exchanger portion.

15. The oil storage system of claim 11 further comprising:
   an oil pump configured to receive oil from the reservoir and to power the oil to the gas turbine engine.

16. The oil storage system of claim 11 wherein the internal oil conduit branches into the heat exchanger portion via a plurality of sub-conduits disposed to surround at least a portion of the reservoir wall portion that surrounds the air space.

17. The oil storage system of claim 11 wherein the heat exchanger portion comprises a fluid mister configured to spray cooling fluid into the air space.

18. The oil storage system of claim 11 further comprising:
   a heat exchanger container configured to receive the oil from the reservoir into a heat exchanger element disposed in the heat exchanger container; and
   a coolant conduit configured to deposit a coolant in the heat exchanger container in thermal contact with the heat exchanger element.

19. The oil storage system of claim 18 wherein the coolant is fuel.

* * * * *